(12) United States Patent
Chamberlain et al.

(10) Patent No.: US 9,870,400 B2
(45) Date of Patent: *Jan. 16, 2018

(54) MANAGED RUNTIME CACHE ANALYSIS

(71) Applicant: International Business Machines Corporation, Armonk, NY (US)

(72) Inventors: Richard N. Chamberlain, Southampton (GB); Howard J. Hellyer, Winchester (GB); Matthew F. Peters, Winchester (GB); Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,584

(22) Filed: Aug. 4, 2015

(65) Prior Publication Data
US 2016/0170876 A1 Jun. 16, 2016

Related U.S. Application Data

(63) Continuation of application No. 14/567,156, filed on Dec. 11, 2014.

(51) Int. Cl.
*G06F 12/02* (2006.01)
*G06F 12/08* (2016.01)
(Continued)

(52) U.S. Cl.
CPC ............ *G06F 17/3048* (2013.01); *G06F 9/46* (2013.01); *G06F 11/3037* (2013.01);
(Continued)

(58) Field of Classification Search
CPC ............... G06F 11/366; G06F 12/0253; G06F 11/3612; G06F 11/3409; G06F 11/3644;
(Continued)

(56) References Cited

U.S. PATENT DOCUMENTS 7,089,272 B1 * 8/2006 Garthwaite ......... G06F 12/0276
8,577,936 B2 11/2013 Burka et al.
(Continued)

OTHER PUBLICATIONS

Appendix P, List of IBM Patents or Patent Applications Treated as Related, pp. 1-2, filed Aug. 5, 2015.
(Continued)

*Primary Examiner* — Sanjiv Shah
*Assistant Examiner* — Edward Waddy, Jr.
(74) *Attorney, Agent, or Firm* — David B. Woycechowsky

(57) ABSTRACT

Analyzing a managed runtime cache is provided. A heap associated with a managed runtime environment, where the heap includes an N-generation cache or a plurality of objects associated with a program operating within a managed runtime environment is identified. A snapshot of the heap is produced, wherein the snapshot identifies a memory location for each object of the plurality of objects at which the object is stored. A generation of each of the plurality of objects based, at least in part, on the memory location of the object is determined. One or more suggestions based, at least in part, on the memory location of the plurality of objects is provided.

5 Claims, 3 Drawing Sheets

(51) Int. Cl.
  *G06F 17/30* (2006.01)
  *G06F 12/0802* (2016.01)
  *G06F 9/46* (2006.01)
  *G06F 11/30* (2006.01)
  *G06F 11/36* (2006.01)
  *G06F 11/34* (2006.01)

(52) U.S. Cl.
  CPC .......... *G06F 11/3409* (2013.01); *G06F 11/36* (2013.01); *G06F 12/0802* (2013.01); *G06F 2201/865* (2013.01); *G06F 2201/885* (2013.01); *G06F 2212/1044* (2013.01); *G06F 2212/608* (2013.01); *G06F 2212/7205* (2013.01)

(58) Field of Classification Search
  CPC ...... G06F 12/023; G06F 8/30; G06F 12/0276; G06F 2212/702
  USPC .................. 711/170, 171, E12.009, E12.002, 711/E12.006, 100, 118, 129, 161
  See application file for complete search history.

(56) References Cited

U.S. PATENT DOCUMENTS

| | | | | |
|---|---|---|---|---|
| 9,384,129 | B2* | 7/2016 | Basu | G06F 12/0269 |
| 2005/0283585 | A1* | 12/2005 | Sexton | G06F 11/366 |
| | | | | 711/171 |
| 2006/0085494 | A1 | 4/2006 | Dussud et al. | |
| 2006/0150168 | A1 | 7/2006 | Mitchell et al. | |
| 2006/0190924 | A1* | 8/2006 | Bruening | G06F 12/0875 |
| | | | | 717/104 |
| 2007/0294480 | A1* | 12/2007 | Moser | G06F 12/123 |
| | | | | 711/133 |
| 2008/0243968 | A1 | 10/2008 | Schmelter et al. | |
| 2009/0328007 | A1 | 12/2009 | Chen et al. | |
| 2012/0041914 | A1* | 2/2012 | Tirunagari | G06F 12/121 |
| | | | | 706/15 |
| 2012/0137059 | A1* | 5/2012 | Yang | G06F 3/0611 |
| | | | | 711/104 |
| 2012/0222005 | A1 | 8/2012 | Harris et al. | |
| 2013/0290641 | A1* | 10/2013 | Corrie | G06F 12/0875 |
| | | | | 711/133 |
| 2013/0318132 | A1* | 11/2013 | Basu | G06F 12/0276 |
| | | | | 707/816 |
| 2014/0325372 | A1* | 10/2014 | Spracklen | G06F 9/4445 |
| | | | | 715/740 |
| 2015/0242227 | A1* | 8/2015 | Nair | G06F 21/60 |
| | | | | 718/1 |
| 2015/0378870 | A1* | 12/2015 | Marron | G06F 11/362 |
| | | | | 717/128 |

OTHER PUBLICATIONS

Sor et al., "A Statistical Approach for Identifying Memory Leaks in Cloud Applications", CLOSER 2011—International Conference on Cloud Computing and Services Science, pp. 623-628.

Wilson et al., "Caching Considerations for Generational Garbage Collection", pp. 32-42, 1992 ACM LISP & F.P. © 1992 ACM.

Zorn, Benjamin, "The Effect of Garbage Collection on Cache Performance (1991)", CiteSeerX, © 2007-2014 The Pennsylvania State University, pp. 1-2, <http://citeseerx.ist.psu.edu/viewdoc/summary?doi=10.1.1.37.745>.

"Managed Runtime Cache Analysis", U.S. Appl. No. 14/567,156, pp. 1-29, filed Dec. 11, 2014.

* cited by examiner

MANAGED RUNTIME CACHE ANALYSIS

BACKGROUND OF THE INVENTION

The present invention relates generally to the field of memory management, and more particularly to cache analysis using garbage collection.

A managed runtime environment is a platform for computer programming that manages specific tasks such as heap management, security, class loading, garbage collection, and memory allocation. Managed runtime environment works closely with the operating system and architecture, allowing programmers to focus efforts on logic targeting a specific problem, instead of all of the tangential tasks needed by the program. Due to the managed runtime environment's ability to handle tangential tasks, such as memory allocation, programmers need not include code for tangential tasks when developing new programs.

A managed runtime program, running in the managed runtime environment, is able to write data to the heap. The heap is an allocated pool of memory that can be utilized by the managed runtime environment for memory storage. The heap contains a cache, to which the managed runtime program can write data objects. As the heap, and consequently the cache, has a limited memory capacity, the heap must be cleaned periodically. The cleaning process of the heap is called garbage collection.

Garbage collection (GC) is a process used by computer programs to manage the heap memory. The GC finds all objects in the heap, determines which objects are still in use (live), removes the unused objects, and reduces fragmentation of the heap. How frequently the GC runs and the order in which the GC steps are completed are determined by the GC policy, which is established within the managed runtime environment.

SUMMARY

According to one embodiment of the present disclosure, a method for managed runtime cache analysis is provided. The method includes identifying, by one or more processors, a heap associated with a managed runtime environment, wherein the heap includes an N-generational cache of a plurality of objects that are associated with a program operating within the managed runtime environment; producing, by one or more processors, a snapshot of the heap, wherein the snapshot identifies a memory location for each object of the plurality of objects at which the object is stored; determining, by one or more processors, a generation of each of the plurality of objects based, at least in part, on the memory location of the object; and providing, by one or more processors, one or more suggestions based, at least in part, on the memory location of the plurality of objects.

According to another embodiment of the present disclosure, a computer program product for managed runtime cache analysis is provided. The computer program product comprises a computer readable storage medium and program instructions stored on the computer readable storage medium. The program instructions include program instructions to identify a heap associated with a managed runtime environment, wherein the heap includes an N-generational cache of a plurality of objects that are associated with a program operating within the managed runtime environment; program instructions to produce a snapshot of the heap, wherein the snapshot identifies a memory location for each object of the plurality of objects at which the object is stored; program instructions to determine a generation of each of the plurality of objects based, at least in part, on the memory location of the object; and program instructions to provide one or more suggestions based, at least in part, on the memory location of the plurality of objects.

According to another embodiment of the present disclosure, a computer system for managed runtime cache analysis is provided. The computer system includes one or more computer processors, one or more computer readable storage media, and program instructions stored on the computer readable storage media for execution by at least one of the one or more processors. The program instructions include program instructions to identify a heap associated with a managed runtime environment, wherein the heap includes an N-generational cache of a plurality of objects that are associated with a program operating within the managed runtime environment; program instructions to produce a snapshot of the heap, wherein the snapshot identifies a memory location for each object of the plurality of objects at which the object is stored; program instructions to determine a generation of each of the plurality of objects based, at least in part, on the memory location of the object; and program instructions to provide one or more suggestions based, at least in part, on the memory location of the plurality of objects.

DETAILED DESCRIPTION

In computing, a cache is a component that transparently stores data. In some cases the cache allows future requests for data to be served faster. Generally, for managed runtime environments, the cache is located within a heap of memory allocated to the managed runtime environment. A program running within the managed runtime environment is able to write data to the cache for later use. Data is managed within the cache using a cache implementation algorithm. The cache implementation algorithm determines which data objects are selected for deletion. When a program needs data it will first check the cache; if the data is written to the cache, the cache can delivers the data to the program. If the data has yet to be calculated, or has been removed from the cache the program calculates the data.

The caching process can increase processing speed. However, in some cases, the cache only increases processing speed if the cache is functioning correctly. A cache that is not maintaining needed data does not, in general, increase the processing speed, and may even impede program processing speed. A cache that is not functioning correctly, in some cases, slows the system down, as the program will waste time in both writing and reading the cache, e.g., the program will waste time and resources writing data to the cache that will be deleted before the data is used. In some cases, time is also wasted searching the cache for deleted data and subsequently recalculating the data. A malfunctioning cache strategy is only one of many reasons a program could be running slow. However, without proper analysis, problems with the cache cannot be diagnosed. In some cases, when a developer does not have access to the source code of the managed runtime program, or does not want to modify the source code, it is difficult to gather statistics as to whether the cache is working effectively.

An embodiment of the present invention provides a process to analyze a cache of a managed runtime environment. The present invention is able to analyze the cache without altering the source code of the managed runtime program. As a result, the present invention can be used on a variety of programs and provides the programmer with data that is used in modifying a malfunctioning cache strategy, leading to increased processing speeds of managed runtime programs.

Figure 1:
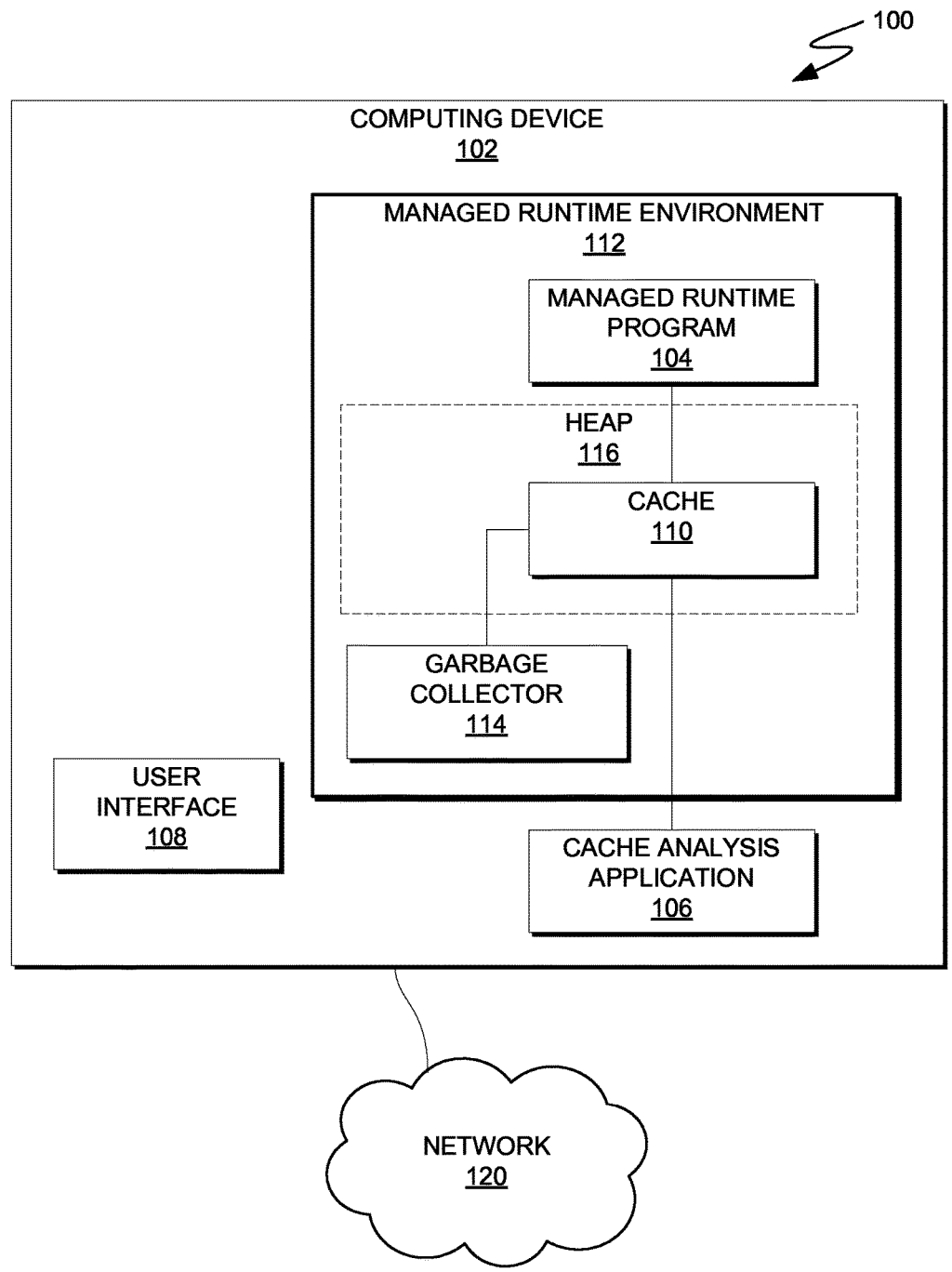
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes computing device 102 connected to network 120. Computing device 102 includes managed runtime environment 112, cache analysis application 106, and user interface 108.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to and/or capable of executing managed runtime environment 112. Computing device 102 may include internal and external hardware components, as depicted and described in further detail with respect to FIG. 3.

Managed runtime environment 112 includes managed runtime program 104, heap 116, cache 110, and garbage collector 114. Managed runtime environment 112 can be any managed runtime application with access to and/or capable of executing managed runtime program 104, including, but not limited to, Java®, WebSphere®, and .NET Framework®. In some embodiments, managed runtime environment 112 executes specific tasks including, but not limited to, heap management, security, class loading, garbage collection, and memory allocation. Further, managed runtime environment 112 is capable of executing program code written in various languages. As a result of the language versatility, applications written for managed runtime environment 112 tasks are written in a language compatible with the language used by heap 116, where data is stored.

In this exemplary embodiment, managed runtime program 104 and cache analysis application 106 are stored on computing device 102. In other embodiments, one or both of managed runtime program 104 and cache analysis application 106 resides on another computing device, provided that each can access and is accessible by managed runtime program 104, cache analysis application 106 and cache 110. In yet other embodiments, one or both of managed runtime program 104 and cache analysis application 106 be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and other computing devices, in accordance with a desired embodiment of the present invention.

Heap 116 is a pool of memory that is allocated to managed runtime environment 112 for memory storage. In one embodiment, heap 116 includes cache 110. In one embodiment, cache 110 includes a portion of heap 116. In another embodiment, cache 110 encompasses all of heap 116. In one embodiment, cache 110 is a portion of heap 116 located within memory of computing device 102. Managed runtime program 104 writes data (e.g., data objects) to cache 110, located within computing device 102. When managed runtime program 104 needs data, managed runtime program 104 first attempts to fetch the data from cache 110 before attempting to calculate the data.

Cache 110 is limited in space; therefore, data is deleted from cache 110 periodically. In some embodiments, a cache implementation algorithm is used to determine what data is deleted from cache 110. The cache implementation algorithm utilizes a predetermined approach to determine what data is deleted. Some approaches include, but are not limited to, 'last recently used', 'first in, first out', or 'last in, first out'. In some embodiments, the approach used by the cache implementation algorithm is changed in response to a signal from user interface 108.

Cache 110 is generational. A generational cache has two or more layers, or generations, to which data is written. A generational cache with n, representing a positive integer, generations is also referred to as an N-generational cache. Another method of removing data written to the cache, and therefore the heap 116, is garbage collector 114. Garbage collector 114 removes data that is no longer in use. In some cases, as garbage collector 114 scans heap 116, garbage collector 114 promotes data from one cache-generation to another. In some embodiments, data is promoted to a higher generation when the data survives a predetermined number of garbage collections. New data is written to the first generation and is promoted, or moved up a level, over time, if the data survives the predetermined number of garbage collections. Garbage collector 114 runs more frequently on lower generations. Therefore, data sent to a higher generation is less likely to be deleted by garbage collector 114.

Managed runtime program 104 operates within managed runtime environment 112 on computing device 102. In general, managed runtime program 104 is a program that utilizes cache 110.

Cache analysis application 106 operates to analyze cache 110 and the cache implementation algorithm. In one embodiment, cache analysis application 106 is located on computing device 102. In another embodiment, cache analysis application is located within managed runtime environment 112. In one embodiment, in response to a signal from user interface 108, cache analysis application 106 analyzes cache 110 dedicated to managed runtime program 104. Cache analysis application 106 finds each set of data and determines the respective generation within cache 110. Cache analysis application 106 then provides results, detailing the percentage of data in each generation. In some embodiments, cache analysis application 106 provides suggestions to make cache 110 perform more efficiently, e.g., changing the size of cache 110 or modifying the algorithm used in the implementation of cache 110.

Computing device 102 includes user interface 108, which executes locally on computing device 102. User interface 108 further operates to receive user input from a user via the provided user interface devices, thereby enabling the user to interact with computing device 102. In one embodiment, user interface 108 provides a user interface device that enables a user of computing device 102 to interact with managed runtime program 104 and cache analysis application 106. In various examples, the user interacts with cache analysis application 106 in order to initiate the analysis and view results. In one embodiment, user interface 108 is stored on computing device 102. In other embodiments, user interface 108 is stored on another computing device, provided that user interface 108 can access and is accessible by at least managed runtime program 104 and cache analysis application 106 via network 120.

Figure 2:
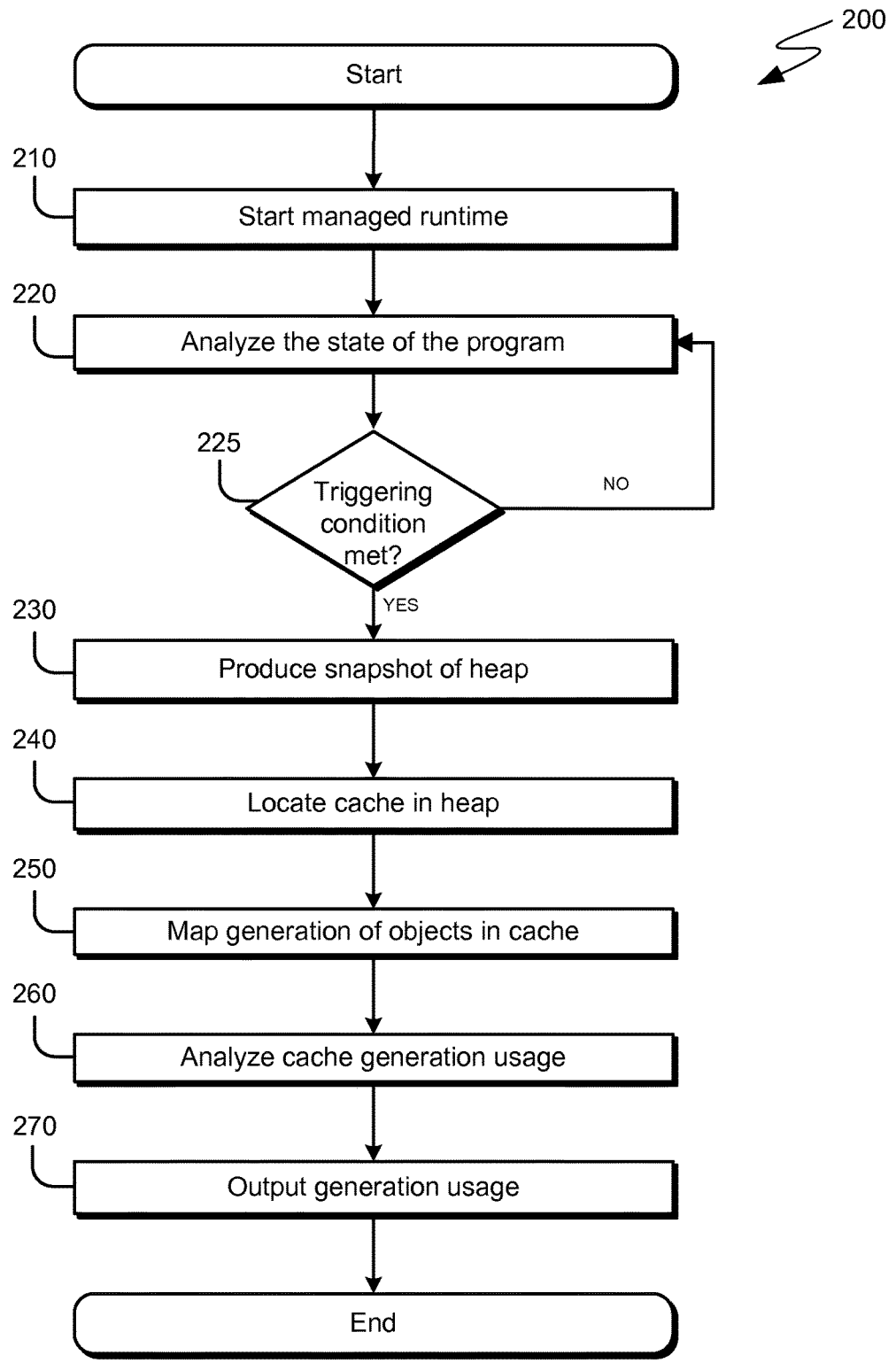
FIG. 2 is a flowchart depicting operations for cache analysis, on a computing device within the computing environment of FIG. 1, in accordance with an embodiment of the present disclosure.

FIG. 2 is a flowchart depicting operations for cache analysis, on a computing device within the computing environment of FIG. 1, in accordance with an embodiment of the present disclosure. For example, FIG. 2 is a flowchart depicting operations 200 of cache analysis application 106, on computing device 102 within computing environment 100. In the depicted embodiment, managed runtime program 104 is operating in managed runtime environment 112 of computing device 102.

In one embodiment, managed runtime environment 112 contains a generational cache 110. The number of generations must be greater than one; however, a cache having more generations (e.g., ten to twenty-four generations) enables a more accurate analysis. The manner in which data is promoted to a higher cache generation is determined by the garbage collection policy of managed runtime environment 112. The garbage collection policy is performed by garbage collector 114. In one embodiment, garbage collector 114 will promote data to a higher cache generation after a specified number of collections. Cache analysis application 106 does not have to recognize the garbage collection policy to function. However, in some cases, awareness of the garbage collection policy aids in the understanding of the results of cache analysis application 106. For example, if managed runtime program 104 has only been running for 12 minutes and the garbage collection policy indicates that the garbage collector 114 runs every 5 minutes, cache analysis application 106 is able to account for the fact that the garbage collector 114 has only run twice. To analyze managed runtime program 104, the program must be started within managed runtime environment 112, step 210.

In step 220, the state of managed runtime program 104 is analyzed. In one embodiment, the state of the managed runtime program 104 is analyzed by cache analysis application 106. In this exemplary embodiment, cache analysis application 106 includes business logic to determine the state of managed runtime program 104. Business logic includes instructions to examine the cache 110 utilization of managed runtime program 104 to determine if the utilization pattern resembles a program during start-up or a program post-start-up. In this exemplary embodiment, cache analysis application 106 determines whether managed runtime program 104 is not operating, operating while conducting startup tasks, or operating after startup tasks have been completed. In another embodiment, cache analysis application 106 starts operating after a set number of garbage collections have occurred on heap 116. In yet another embodiment, cache analysis application 106 begins operations 230 through 270 a set period of time after managed runtime program 104 begins executing. In still another embodiment, managed runtime program 104 begins executing in response to receiving a signal from user interface 108.

In decision 225, cache analysis application 106 determines whether a triggering condition has been met. In one embodiment, the triggering condition is managed runtime program 104 reaching steady-state. The steady-state of managed runtime program 104 is a state of operation wherein the initial startup has completed. In one embodiment, cache analysis application 106 begins operating any time after managed runtime program 104 has reached steady state. In an embodiment where steady-state is the triggering condition, cache analysis application 106 determines if managed runtime program 104 has reached steady-state. In another embodiment, the triggering condition is met after a fixed time has elapsed after the start of managed runtime program 104. In yet another embodiment, the triggering condition is met in response to a predetermined number of garbage collection occurring on heap 116.

In step 230, a snapshot of heap 116 is produced. In one embodiment, the snapshot is a record of the location of each piece of data in heap 116 at a point in time when the snapshot is taken. Cache 110 is located within heap 116. As, in some embodiments, cache 110 encompasses only a portion of heap 116, cache analysis application 106 discerns which portions of heap 116 are being utilized by managed runtime program 104 for caching purposes, step 240. In some embodiments, cache analysis application 106 will analyze only cache 110 dedicated to managed runtime program 104.

Cache 110 is comprised of multiple generations, such that there are at least two generations. In some embodiments, data is written to the base generation and subsequent generations are designated by age, i.e., if a cache has ten generations, generation one is the base generation and generation ten is the oldest generation. In this exemplary embodiment, data is promoted to older generations in sequential numerical order, i.e., data is moved from generation one to generation two, and so on. Garbage collector 114 collects garbage for the entirety of the heap 116. However, in the following embodiment, focus is given to the actions of garbage collector 114 on cache 110. In general, data written to cache 110 is promoted to an older cache-generation based on the garbage collection policy of managed runtime program 104.

In some embodiments, data is promoted after the data has survived a program-specified number of garbage collections. In this exemplary example, the program-specified number is different for each generation. However, is another embodiment the program-specified number is the same for two or more generations. Garbage collector 114 collects garbage more frequently on the base generation. Likewise, garbage collection frequency, in general, decreases for older generations.

In step 250, cache analysis application 106 maps the generation of each object in cache 110. In the mapping process, cache analysis application 106 determines the location of the object within the heap. In response to determining the location of an object in the heap, cache analysis application 106 determines the generation corresponding to that location, based on communications with the garbage collector 114. In some embodiments, cache analysis application 106 records (e.g., to a database) the cache-generation of each piece of data contained in cache 110.

In step 260, cache analysis application 106 analyzes the cache generation usage. In some embodiments, cache analysis application 106 determines the amount of data in each cache-generation. In some embodiments, the amount of data is characterized as the number of objects, or functional groups of data. In this exemplary embodiment, cache analysis application 106 divides the number of cached objects in one generation by the total number of cached objects in cache 110 to determine a percentage of cached objects that are in that generation. This calculation is done for each generation to determine a distribution of cached objects across the generations.

Cache analysis application 106, in some embodiments, determines if cache 110, cache implementation algorithm, and garbage collector 114 are functioning properly, in response to the calculation of each cache-generation's usage. If cache 110, cache implementation algorithm, or garbage collector 114 are malfunctioning (e.g., failing to function or functioning with substandard efficiency), a large portion of the data will be located in the base generation, indicating data is being deleted and rewritten before the data is able to be promoted to an older generation. In some scenarios, a malfunctioning cache 110 is writing the wrong data to the cache, such that the data is unusable by managed runtime program 104. If data is frequently being deleted and rewritten to cache 110, memory resources are not being used effectively. In some scenarios, ineffective use of memory resources causes performance problems within managed runtime program 104. Properly functioning cache 110, cache implementation algorithm, and garbage collector 114 have data dispersed among several cache-generations, indicating data is being promoted to older generations following the garbage collection policy.

In some embodiments, the calculations done by cache analysis application 106 are used to improve the reliability and speed of the managed runtime environment 112 and the computer itself. In some cases, the calculations are used to determine if the cache is being efficiently utilized, including the minimization of recalculating data. In other embodiments, the calculations of cache analysis application 106 are used by program developers while developing programs, to ensure that only data that needs to be cached is being stored in the cache. Lastly, the calculation of cache analysis application 106 improves existing technology by analyzing the cache usage of programs without the need to modify the program code.

In step 270, cache analysis application 106 outputs results. In one embodiment, the results of cache analysis application 106 calculations are displayed as percentage of data in each cache-generation. The data distribution percentages can be displayed in various ways including, but not limited to, a graph, a chart, a message prompt, or a spreadsheet. In some embodiments, a visual depiction of the data distribution will be presented on a display (e.g., computer monitor).

In an embodiment where cache analysis application 106 results are displayed via a message prompt, the message prompt includes the calculated cache-generation percentages and suggested actions to improve cache 110 performance. Some possible suggestions include, but are not limited to, increasing the size of cache 110, decreasing the size of cache 110, or altering the cache implementation algorithm. In some embodiments, cache analysis application 106 includes logic which allows cache analysis application 106 to make changes to cache 110 or the cache implementation algorithm in response to a signal from user interface 108. In some embodiments, cache analysis application 106 suggests certain objects be stored somewhere else (e.g., slower but more abundant memory) to free up memory in cache 110.

In one example, cache analysis application 106 suggests the size of cache 110 be increased. Such a suggestion occurs if a large portion (e.g., 90%) of the data was in the base cache-generation. This result would indicate that there is a rapid turnover of objects in cache 110. In this example, cache analysis application 106 suggests the size increase of cache 110 and implements operations 200 until a lower percentage of data is found in the base cache-generation.

In another example, cache analysis application 106 suggests the size of cache 110 be decreased. Such a suggestion occurs when a large portion (e.g., 99%) of the data in the oldest cache-generation. This result would indicate that cache objects are rarely deleted to make room for new data. Further, the result would indicate that memory space is being wasted.

In yet another example, cache analysis application 106 suggests that the cache implementation algorithm be modified. For example, the algorithm could be changed from a "first in, first out" to a "last in, first out" approach. Such a recommendation is made if a large portion of data (e.g., 90%) is found in the base generation. Further, such a recommendation is needed if the size of cache 110 cannot be modified, e.g., when there is a limited amount of free memory that is available for allocation. In response to giving a recommendation to change the cache implementation algorithm, cache analysis application 106 will implement operations 200 until a lower percentage of data is found in the base cache-generation.

In one embodiment, cache analysis application 106 implements the suggestion based on one or more user rules. Each user rule defines a modification to one or more of cache 110 or the cache implementation algorithm. Each user rule corresponds to a suggestion. For example, cache analysis application 106 determines that 90% of the objects are in the base generation, as a result of running operations 200. Cache analysis application 106 suggests increasing the size of cache 110, to accommodate the memory storage needs of managed runtime program 104. In this case, cache analysis application 106 implements the suggestion based on one or more user rules by allocating more of heap 116 to cache 110.

Figure 3:
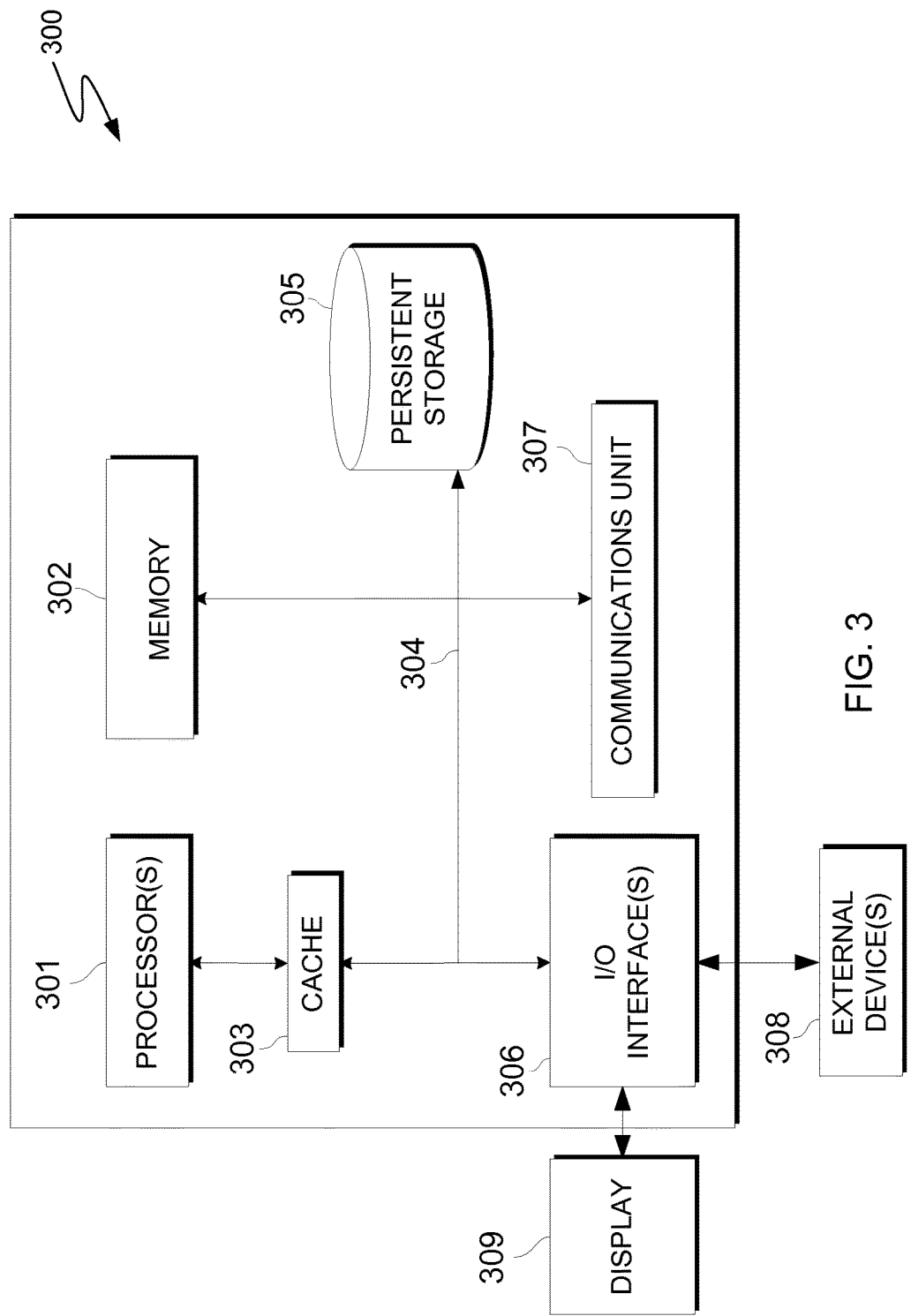
FIG. 3 is a block diagram of components of a computing device executing operations for cache analysis, in accordance with an embodiment of the present disclosure.

FIG. 3 is a block diagram of components of a computing device, generally designated 300, in accordance with an embodiment of the present disclosure. For example, FIG. 3 is a block diagram of computing device 102 within computing environment 100, in which case computing device 102 includes at least cache analysis application 106.

It should be appreciated that FIG. 3 provides only an illustration of one implementation and does not imply any limitations with regard to the environments in which different embodiments may be implemented. Many modifications to the depicted environment may be made.

Computer system 300 includes processor(s) 301, cache 303, memory 302, persistent storage 305, communications unit 307, input/output (I/O) interface(s) 306 and communications fabric 304. Communications fabric 304 provides communications between memory 302, cache 303, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer-readable storage media. In this embodiment, memory 302 includes random access memory (RAM). In general, memory 302 can include any suitable volatile or non-volatile computer-readable storage media. Cache 303 is a fast memory that enhances the performance of processor(s) 301 by holding recently accessed data, and data near recently accessed data, from memory 302. Cache 303 is different than cache 110, as in many embodiments, cache 110 would reside in memory 302.

Program instructions and data used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer-readable storage medium that is also part of persistent storage 305.

Communications unit 307, in these examples, provides for communications with other data processing systems or devices, including resources of network 120. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to computing device 300. For example, I/O interface(s) 306 may provide a connection to external device(s) 308 such as a keyboard, keypad, a touch screen, and/or some other suitable input device. External device(s) 308 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 305 via I/O interface(s) 306. I/O interface(s) 306 also may connect to a display 309.

Display 309 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method for use with a managed runtime cache, the method comprising:
    during runtime of a set of application(s), performing garbage collection on the managed runtime cache under a garbage collection policy such that there is a heap of data identifying garbage under collection with the heap being logically organized into a plurality of N generations,
    determining that an application state with respect to the set of applications is steady, responsive to the determination that the application state is steady, generating a first snapshot of the heap,
    locating a cache container object corresponding to the managed runtime cache in the heap,
    for each given object of a plurality of objects in the managed runtime cache:
        finding the given object in the heap,
        determining a generation value of the given object based on memory segments,
        mapping an address of the given object to the memory segments used in the determination of the generation value, and
        recording the generation value of the given object, and
    for each given generation of the plurality of N generations of the heap, calculating a proportion of cached objects having a generation value equal to the given generation;
    determining that the proportion of cached objects in a base generation is above a predetermined threshold; and
    determining that a cache implementation algorithm is functioning with substandard efficiency based, at least in part, on the determination that the proportion of cached objects in a base generation is above the predetermined threshold.

2. The method of claim 1 further comprising:
    responsive to the determination that the cache implementation algorithm is functioning with substandard efficiency, increasing the size of the cache.

3. The method of claim 1 further comprising:
    responsive to the determination that the cache implementation algorithm is functioning with substandard efficiency, decreasing the size of cache.

4. A method for use with a managed runtime cache, the method comprising:
    a storage device; and
    computer code stored in the storage device, with the computer code including machine readable instructions and data for causing a computer to perform operations including at least the following:
        during runtime of a set of application(s), performing garbage collection on the managed runtime cache under a garbage collection policy such that there is a heap of data identifying garbage under collection with the heap being logically organized into a plurality of N generations,
        determining that an application state with respect to the set of applications is steady,
        responsive to the determination that the application state is steady, generating a first snapshot of the heap,
        locating a cache container object corresponding to the managed runtime cache in the heap,
        for each given object of a plurality of objects in the managed runtime cache:
            finding the given object in the heap,
            determining a generation value of the given object based on memory segments,
            mapping an address of the given object to the memory segments used in the determination of the generation value, and
            recording the generation value of the given object, and
        for each given generation of the plurality of N generations of the heap, calculating a proportion of cached objects having a generation value equal to the given generation; and
        determining that the proportion of cached objects in a base generation is above a predetermined threshold; and determining that the performance of garbage collection is functioning with substandard efficiency based, at least in part, on the determination that the proportion of cached objects in a base generation is above the predetermined threshold.

5. The method of claim 4 further comprising:

responsive to the determination that the performance of garbage collection is functioning with substandard efficiency, changing the garbage collection policy.

\* \* \* \* \*